(12) United States Patent
Lopez Fernandez et al.

(10) Patent No.: US 10,924,426 B2
(45) Date of Patent: Feb. 16, 2021

(54) SYSTEM AND METHOD FOR INTELLIGENT BANDWIDTH ALLOCATION ON MULTI-TRACK MULTIMEDIA COMMUNICATION SYSTEMS

(71) Applicant: Twilio Inc., San Francisco, CA (US)

(72) Inventors: Luis Lopez Fernandez, Mostoles (ES); Miguel Paris Diaz, Mostoles (ES); David Fernandez Lopez, Fuenlabrada (ES)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 16/655,919

(22) Filed: Oct. 17, 2019

(65) Prior Publication Data
US 2020/0127940 A1  Apr. 23, 2020

(30) Foreign Application Priority Data
Oct. 17, 2018  (ES) .............................. ES201831009

(51) Int. Cl.
*H04L 12/927* (2013.01)
*H04L 29/06* (2006.01)
*H04N 7/15* (2006.01)

(52) U.S. Cl.
CPC .......... *H04L 47/801* (2013.01); *H04L 47/805* (2013.01); *H04L 65/403* (2013.01); *H04L 65/80* (2013.01); *H04N 7/15* (2013.01)

(58) Field of Classification Search
CPC combination set(s) only.
See application file for complete search history.

(56) References Cited

U.S. PATENT DOCUMENTS

| | | | |
|---|---|---|---|
| 2007/0033289 A1* | 2/2007 | Nuyttens | G06F 3/1446 709/230 |
| 2009/0089294 A1 | 4/2009 | Davis et al. | |
| 2015/0036755 A1 | 2/2015 | Garrett | |

(Continued)

FOREIGN PATENT DOCUMENTS

| | | |
|---|---|---|
| CN | 103841361 A | 6/2014 |
| WO | WO-2008027724 A1 | 3/2008 |
| WO | WO-2014066600 A2 | 5/2014 |

OTHER PUBLICATIONS

"Spanish Application Serial No. P201831009, Office Action dated Dec. 26, 2018", w machine English translation, 7 pgs.

(Continued)

*Primary Examiner* — Phung-Hoang J Nguyen
(74) *Attorney, Agent, or Firm* — Schwegman Lundberg & Woessner, P.A.

(57) ABSTRACT

Disclosed are systems, methods, and non-transitory computer-readable media for bandwidth allocation in multi-track media communication that can include receiving a set of inbound media tracks; resolving track priority configuration for the set of media tracks; resolving media constraints that are at least partially derived from properties of the set of media tracks; producing bandwidth allocation configuration based on at least the track priority configuration and media constraints; and allocating bandwidth to outbound media tracks within a communication link to a client device wherein bandwidth of the outbound media tracks is allocated based on the bandwidth allocation configuration.

17 Claims, 10 Drawing Sheets

(56) References Cited

U.S. PATENT DOCUMENTS

| | | | |
|---|---|---|---|
| 2017/0237795 A1* | 8/2017 | Wogsberg | H04N 7/181 |
| | | | 709/219 |
| 2018/0192003 A1 | 7/2018 | Gero et al. | |
| 2018/0227187 A1 | 8/2018 | Duvanenko et al. | |
| 2018/0295164 A1* | 10/2018 | Li | H04L 65/1023 |
| 2019/0166169 A1* | 5/2019 | Norum | H04L 63/0838 |

OTHER PUBLICATIONS

"Spanish Application Serial No. P201831009, Office Action dated Mar. 19, 2019", w machine English translation, 7 pgs.
"Spanish Application Serial No. P201831009, Response filed Jul. 11, 2019 to Office Action dated Mar. 19, 2019", w machine English translation, 28 pgs.
"Spanish Application Serial No. P201831009, Response filed Mar. 4, 2019 to Office Action dated Dec. 26, 2018", w machine English translation, 12 pgs.
"Spanish Application Serial No. P201831009, Office Action dated Nov. 6, 2020", w/o English Translation, 5 pgs.
Liu, Jiangchuan, et al., "Channelized partitioning problem in multirate broadcasting over bandwidth-constrained networks", The 13th IEEE International Symposium on Personal, Indoor and Mobile Radio Communications, Portugal, (Sep. 15-18, 2002), 5 pgs.
Sakate, H, et al., "Resource management for quality of service guarantees in multiparty multimedia application", Proceedings of the 6th International Conference on Network Protocols, Austin, TX, USA, (1998), 8 pgs.
Umamaheswari, Devi C, et al., "Multi-tiered, burstiness-aware bandwidth estimation and scheduling for vbr video flows", IEEE Transactions on Network and Service Management, 10(1), (Mar. 2013), 29-42.

* cited by examiner

SYSTEM AND METHOD FOR INTELLIGENT BANDWIDTH ALLOCATION ON MULTI-TRACK MULTIMEDIA COMMUNICATION SYSTEMS

CROSS-REFERENCE TO RELATED APPLICATIONS

This application claims the benefit of Spanish Patent Application No. P201831009, filed on Oct. 17, 2018, which is incorporated in its entirety by this reference.

TECHNICAL FIELD

An embodiment of the present subject matter relates generally to media communication and, more specifically, to system and method for intelligent bandwidth allocation on multi-track multimedia communication systems.

BACKGROUND

Group conferencing for video or audio conferencing continues has seen tremendous growth as a form of communication in recent years. Trends in globally distributed teams, workforces, and business operations have driven the need for high quality and reliable media conferencing across a large number of participants. There are a variety of conferencing topologies that have been explored.

A mesh network topology can be used to interconnect each of the participants together. In some implementations, each participant sends their media to all of the other participants and receives media from each of the participants. Each participant will have a connection to each other participant. This topology can have high upload and download networking bandwidth requirements and can be computationally expensive.

A mixing topology may employ a multiparty conferencing unit (MCU), where a central computing system takes media from the participants, processes the media thereby mixing a resulting media result and transmitting the resulting media to the participants. Computational and networking requirements of the MCU can be expensive.

Many modern real-time multimedia communication systems, such as the ones based on WebRTC (Web Real-Time Communication) standards, use media bundling techniques for communicating different media sources as separated media tracks. A relevant example of this includes the use of SFUs (Selective Forwarding Units) architected for multi-party video conferencing services. In an SFU-based network topology, the participants upload their media stream to an SFU computing resource functioning as a media routing machine, and the SFU sends back the media streams of the other participants. In those, every subscriber receives the rest of participant's videos as separate tracks that share the same transport ICE (Interactive Connectivity Establishment) connection. Due to this, at every subscriber's access link, these tracks compete for the same bandwidth. That link may, however, have limited capabilities, which can result in various issues. One common approach used in today's systems is uniform allocation so that all tracks are assigned the very same bandwidth (i.e. the available link bandwidth is divided by the number of video tracks being sent through that link). This may be accompanied by several issues that can result in media tracks failing to deliver an appropriate media experience to an end user. Thus, there is a need in the media communication field to create a new and useful system and method for intelligent bandwidth allocation on multi-track multimedia communication systems. This invention provides such a new and useful system and method.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for intelligent bandwidth allocation in multiparty communications.

Overview

Figure 1:
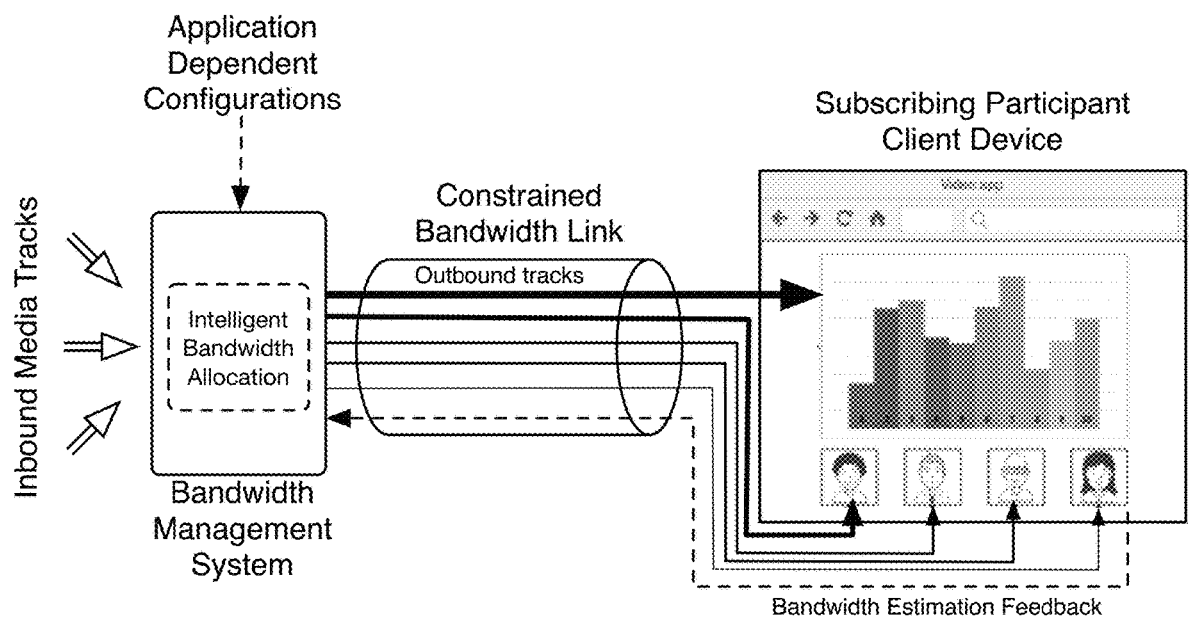
FIG. 1 is a schematic representation of a system for intelligent bandwidth allocation.

A system and method for intelligent bandwidth allocation on multi-track multimedia communication systems of an embodiment function to deliver an enhanced media experience that accounts for numerous use-cases, media formats, and bandwidth constraints. In particular, the system and method can be used in media routing to intelligently split bandwidth among multiple media tracks that share the same communication link such as when multiple video tracks are streamed to a participant in a multi-party video call as shown in FIG. 1. The system and method can dynamically adjust bandwidth allocation based on a variety of factors such as application-specific prioritizes (e.g., use case of the application or settings/state of an end-user client), media limitations, bandwidth usage and limitations, and/or other factors.

Figure 2:
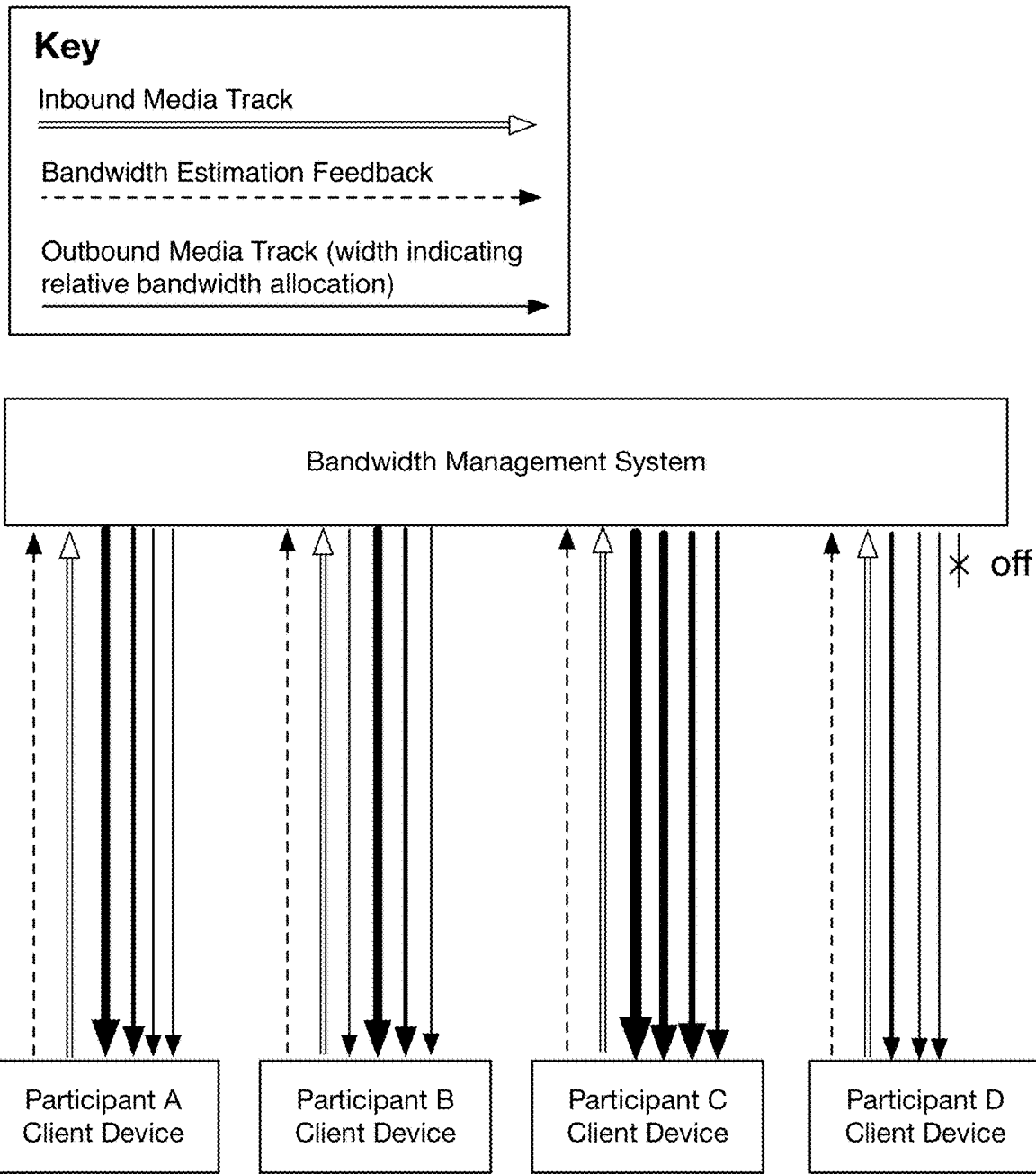
FIG. 2 is a schematic representation of bandwidth management system managing media track communication to multiple participants through multiple communication links.

The system and method preferably use a bandwidth management system in dynamically adjusting and/or setting bandwidth allocation for a number of tracks within at least one communication link. More preferably, the bandwidth management system dynamically adjusts and/or sets bandwidth allocation for media tracks sent over communications links to multiple participants. The dynamic adjustment may be individualized for select participants in some variations as shown in FIG. 2. The system and method may be further extended such that management could be applied across multiple links for different multiparty conversations and possibly serving different use-cases. Herein, the system and method are primarily discussed in the context of a single link (i.e., multiparty conversation), which as one reasonably skilled in the art would appreciate may be extended to more than one link.

A bandwidth management system can be architected to assess many conditions, which may be configured in execution as heuristic-based processing of conditions, algorithmic/machine-learned processing of the conditions, or processed through any suitable detection/classification approach. The bandwidth management system preferably manages outbound communication links according to multiple factors. Three potential factors can include media track priority, media track limitations, and bandwidth usage and limitations. The various factors may be assessed such that a set of conditions is satisfied and a resulting assignment of bandwidth usage and configuration for an outbound link determined.

In one exemplary implementation, a bandwidth management system can apply management processes that assign priorities, assign maximum and minimum bandwidth constraints, and assign bandwidth.

As a first process, tracks can be assigned priorities, which may depend on the track content, on the use-case, on the application or end-user preferences, and/or other contextual properties. Track priorities may be automatically determined through processing and analysis of the media content. For example, an audio track can be processed for speech or a video track may be processed for motion or human presence. In another variation, media track priorities can be set in response to application specific configuration (potentially set for an entire account scope) or detected end-user behavior on a receiving client device (e.g., browser or smartphone).

As a second process, tracks can be assigned maximum and minimum bandwidth constraints, which may depend on the track encoding, track transport, on the use-case or on the application, end-user preferences, and/or other constraint properties. Bandwidth or other media constraints may be obtained through analysis of the inbound media links uploaded by participants. Bandwidth constraints may additionally or alternatively be set by an associated developer account or in response to end user input on a client device.

As a third process, tracks can be assigned bandwidth in an iterative periodic scheme through an optimization algorithm. Various conditions, targets, and/or guarantees can be specified through such a process. The bandwidth assignment process preferably operates to satisfy a set of properties. In one potential property, tracks are assigned as much bandwidth as possible provided that the other property conditions or a select set of property conditions are/is satisfied. As another potential property, the sum of consumed bandwidth by all the tracks must be less than or under the total link available bandwidth. As another potential property, tracks are allocated a bandwidth under their respective maximum possible bandwidth. As another potential property, tracks are each allocated a bandwidth over its minimum or else the track is switched-off. As another potential property, track switch-off and -on follows priorities so that lower priority tracks are always switched-off first and switched-on last in relation to on/off state of other tracks. As another potential property, track bandwidth allocation can follow a monotonic function of their priorities. For example, for the identity function, that means that tracks with double priority are assigned double bandwidth as long as they are within their constraint bounds.

As a complimentary process, the bandwidth management system can receive actual bandwidth data associated with a communication link and that serves as an input to the bandwidth assignment process. Other forms of usage feedback may additionally be received such as client media usage, which can include end-user prioritization (e.g., which media tracks are being consumed and how) or media limits (e.g., client device or application limitations).

The bandwidth management system is preferably configurable and can support a programmatic interface and preferably an application programming interface (API) or other suitable mechanism for programmatically setting properties used in managing bandwidth.

The system and method can be used in a variety of media communication use-cases. Preferably, the system and method are used in connection with multi-party communication. More specifically, the system and method are used with a multi-party video chat or call communication session. The system and method may additionally or alternatively be used with any communication or synchronous data stream. Media streams can be any suitable media/data transmission of data to facilitate synchronous communication through one or more mediums. The system and method may be used for facilitating video, voice/audio, multimedia (e.g., screensharing or game/interactive media), data, and/or other suitable forms of media streams. The system and method can be used to improve conference calls where there are many active or potentially active participants, one (or a few) to many communications (e.g., talks with a small number of active participants and many observers), and/or other communication scenarios.

Herein, references to a media track are used to characterize a media stream, which is a data transmission of a synchronous data set. A media track will generally originate from one participant. Though, in some variations, a media track processed and used by the system and method may have been a new media stream generated from media streams from multiple other sources. A media track can be a streamed video and/or audio of a participant collected at a client device (e.g., a camera and/or microphone on a computing device like a phone or computer). A media track may alternatively be any suitable real-time data stream as mentioned above.

Herein, references to a communication link characterize a synchronous data connection from the system to a client device. Each client device (and accordingly each active participant sending or receiving media/data) will preferably have an established communication link. In some preferred implementations, the communication link is facilitated over WebRTC (Web Real-Time Communication), which is a technology adopted by many web browsers, mobile applications to provide a common set of protocols and conventions in facilitating real-time communications. In WebRTC, the communication link can be established as an "RTCPeerConnection". One or more media tracks can be transmitted to a connected client device over the communication link.

The media tracks are preferably communicated through a communication link to the participants of a communication session. Herein, reference to a communication session is used to characterize the group communication of a set of participants, which can involve the collective data communication used in enabling communication between the set of participants. In general, one communication link is preferably established for each participant. Though alternative variations may enable end participants to at least partially share a communication link. For example, one communication link may be communicated to an intermediary proxy or router device that retransmits the media tracks over two different communication links. In this example, the outbound communication link from the system to the router may be, from the perspective of the system, shared by two participants.

In one implementation, the system and method may be implemented in connection with a media communication service such as a conference call service wherein people use the service explicitly for facilitating video, media, data and/or other forms of synchronous communications. A conference call service can generally be implemented through a cloud-based/server-based computing infrastructure, which may be hosted in a single location or distributed across multiple locations. The computing infrastructure can include servers, data storage, network and virtualization software, and/or any suitable computing systems. A conference call service may include an account system, wherein individual accounts can setup and configure individualized use of the conference call service. Within the scope of an account, multiparty conference calls may be conducted or scheduled. The configuration and usage of the conferencing capabilities of the conference call service by an account can serve as input to the bandwidth management system in enhancing the bandwidth management for improved performance based on properties of the conference calls and/or usage patterns of conferences of a given account.

In an alternative implementation, the system and method may be implemented in connection with a media communication developer tool or service wherein a communication service facilitates communication sessions on behalf of another service. For example, a multitenant communication-as-a-service (CaaS) computing platform may use the system and method for a video conferencing tool used by various applications or services to enable video conferencing within their own application or service. As one potential feature, the system and method may enable a user of the CaaS platform to specify a user-case or layout from a set of pre-configured modes. Exemplary modes could include grid-video chat, presentation, and collaboration.

A multitenant CaaS computing platform can also be implemented through cloud-based/server-based computing infrastructure, which may be hosted in a single location or distributed across multiple locations. The computing infrastructure can include servers, data storage, network and virtualization software, and/or any suitable computing systems. A CaaS computing platform may include an account system, wherein individual accounts can setup and configure individualized use of the communication services offered by the CaaS computing platform. In this case, the account holders will generally be developer accounts or managing accounts and used in developing and integrating communication service of the CaaS computing platform with an outside communication service or application. As such, the CaaS may be used in a wide variety of communication scenarios. The system and method can be employed in addressing the various needs and use-cases of a diverse set of developers. For example, one account may make use of video or audio conferencing service of the CaaS computing platform in providing very large video conferences with 10's, hundreds, or even thousands of participants, and another account may integrate video conferencing services of the CaaS computing platform for collaboration of 2-8 participants. Many other forms of use may be created using the CaaS computing platform, and the system and method can facilitate dynamically adapting to the usage conditions.

As a conferencing call service operating as a conferencing computer platform and/or as a CaaS computing platform, the system and method can preferably offer flexibility and individualized control over the options in how media is communicated. While many legacy solutions only had to consider multiparty conferencing for one application and/or use-case, the system and method can preferably accommodate a wide variety of requirements and preferences of the outside applications or software services using the system and method.

In another implementation, the system and method may be implemented as a dynamic SFU computing device. In such an implementation, an SFU computing device which can be a computer, a server, router, a virtual machine operating on a computer, and/or any suitable application or software package or hardware-implemented system that includes a machine-readable storage medium comprising instructions that, when executed by one or more processors of a machine, cause the machine to perform operations of the system and method.

The system may additionally or alternatively be implemented within a dynamic SFU system, which may include a plurality of dynamic SFU computing devices that collectively operate. A plurality of dynamic SFU computing devices may individually handle multiple multi-party conferencing sessions A plurality of dynamic SFU computing devices may alternatively cooperatively handle a conferencing session wherein each dynamic SFU facilitates at least a portion of the processes used in intelligently management the communication link.

As one potential benefit, the system and method can manage media tracks in a use-case relevant manner. This may result in improved user experience for participants involved in a communication. The system and method preferably provide a mechanism for assigning priorities to the different video tracks and such priorities should influence the bandwidth allocation so that higher priority tracks should be assigned more bandwidth than lower priority tracks.

As another potential benefit, the system and method can accommodate media track bandwidth limitations in coordination with application specific preferences. For example, there are video codecs and coding techniques that can depend on a video track having a minimum bandwidth under which the video track cannot be sent. There are also situations in which tracks have a maximum bandwidth and any extra capability allocated to them would be lost. The system and method preferably incorporates such constraints into a dynamic bandwidth allocation process.

As another potential benefit, the system and method function to accommodate a variety of scenarios. The priorities of media tracks and their coordination can be specifically configured for an application or even a particular communication session. In some variations, this prioritization can change within a communication session.

As another potential benefit, the system and method may provide a mechanism for outside configuration and control. The system and method, in some variations, can provide a programmatic interface such as an API or some network communication protocol for relaying information. The programmatic interface may be used in specifying application, conference, or end-user specific parameters that may be used in adjusting the bandwidth allocation.

As another potential benefit, the system and method may dynamically respond to usage by an end client device in a conference or usage patterns of conferences associated with an account (e.g., a developer, host, or participant account). The system and method may not only provide some mechanism for directed control, but the system and method may additionally automatically adjust bandwidth allocation in an intelligent manner that is context sensitive. In some variations, the system and method may employ learning applied per client device, user account of a participant, application or developer account, or across multiple entities in a platform (e.g., platform-wide learning).

System

Figure 3:
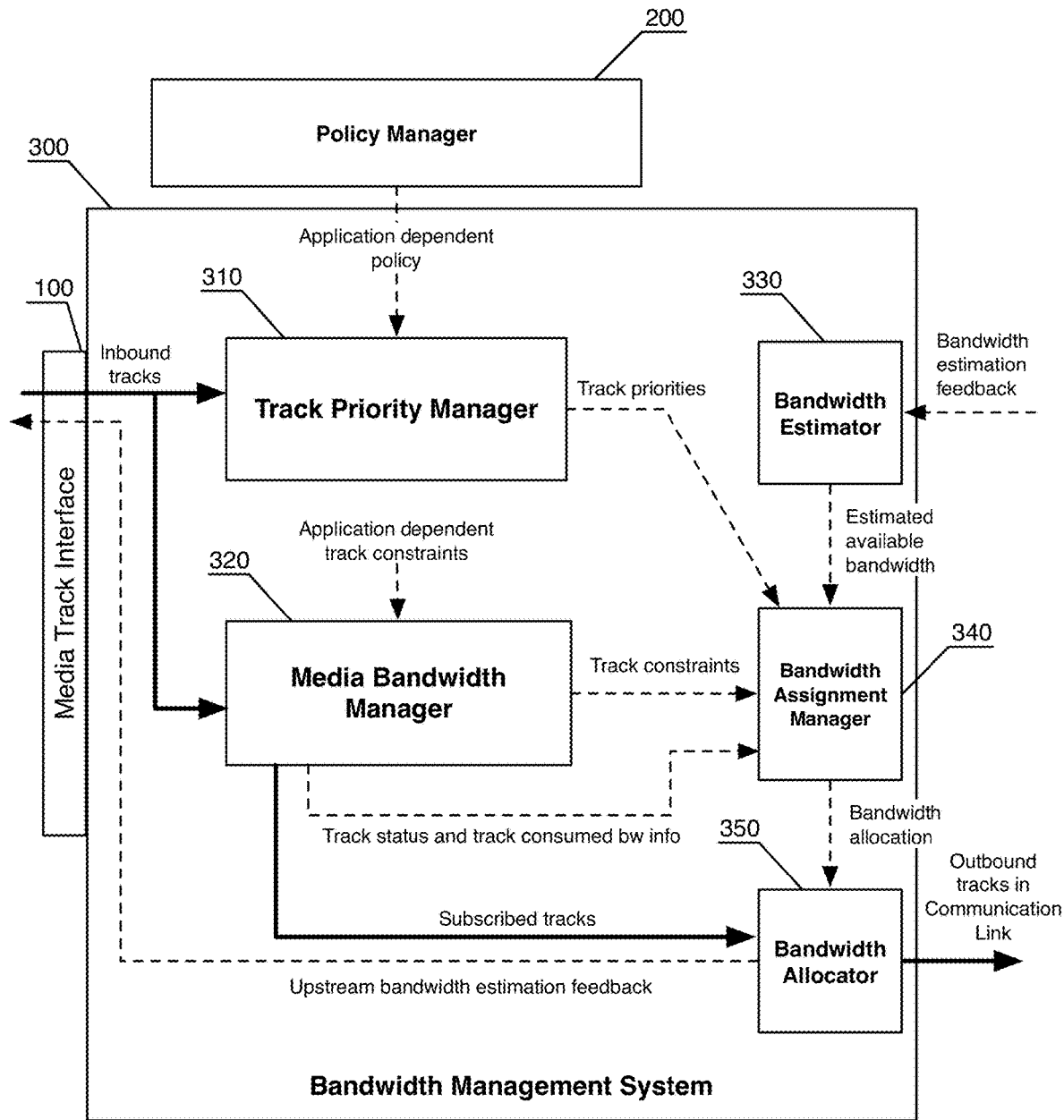
FIGS. 3 and 4 are detailed block diagram representations of a system for intelligent bandwidth allocation.

As shown in FIG. 3, a system for intelligent bandwidth allocation of a multi-track multimedia communication of a preferred embodiment preferably includes a media track interface 100 through which multiple inbound media tracks are received, a policy manager 200 through which application dependent configurations can be specified, a bandwidth management system 300 that can dynamically adjust bandwidth allocation of a set of media tracks when establishing a communication link to one or more participant client devices. A set of media tracks is transmitted to participant client device through the communication link. The bandwidth management system 300 preferably includes a track priority manager 310, a media bandwidth manager 320, a bandwidth estimator 330, and a bandwidth assignment manager 340 as shown in FIG. 3.

The system is preferably implemented in a server or server system that is a network accessible device or system (e.g., a collection computing resources). The system is generally remote from the participant client devices in that the participants transmit communications to the system. In some variations, described below, the system may additionally include client device service software that can operate on a client device, where the client device may provide bandwidth feedback, participant media priority, client device media constraints and/or other forms of feedback and input.

The media track interface 100 functions as an interface for inbound media tracks (e.g., media streams). Inbound media tracks may also be received through the communication link, wherein the inbound media tracks are uploaded from a participant client device to the system. The system preferably operates on a number of inbound media tracks intended for one or more subscribing client devices. A media track preferably refers to audio and/or video tracks being generated by remote publishers. Media tracks are typically encoded using a codec that may or may not be a SVC (Scalable Video Codec) or may or may not be represented by different independent sub-tracks (e.g. Simulcast). The media tracks may additionally or alternatively include other suitable types of media tracks such as a data stream for interactive multi-media applications. The media track interface 100 may have media tracks directly communicated from a publishing client device. The media track interface 100 may alternatively receive media tracks redirected from some other media/communication system. The media track interface 100 preferably acts as an input to the bandwidth management system 300.

The policy manager 200 functions to manage policy configuration usable in one or more communication links and/or communication sessions. The policy manager 200 preferably stores and communicates stored configuration or policy to the bandwidth management system 300. A policy manager 200 can enable application-dependent configuration to be defined for individual communication links, communication sessions, groups of communication sessions, communication sessions of an account, communication sessions of a sub-account, and/or for any suitable scope. Application-dependent configurations preferably characterize any information provided by a RTC (Real Time multimedia Communication) application determining how the bandwidth management system 300 behaves. This information may include publish/subscribe information, quality control information, media processing information, bandwidth properties, media dimension properties, track count limits, and/or other factors.

In one variation, there may be preset configuration properties that can be conveniently enabled by setting a communication session to a particular mode. Exemplary modes could include grid-video chat, presentation, and collaboration. In a grid-video chat, the media of the links will generally be presented in a substantially uniform manner. In a presentation mode, there will generally be a dominant link that is acting as the main participant. In some cases, that presenter may be sharing a screen. The other participants may or may not be actively participating. For example, the policy manager 200 could support a broadcast variation of the presenter mode wherein a select set of participants can be indicated as the primary broadcasters and the remaining participants as "view" only. In a collaboration mode, the priority of a link changes based on participation. Participation may be speaker based, movement based, or based on any suitable metric of participation. As an example, the policy manager 200 could support a collaboration conference mode that enables settings in the application-dependent to adjust settings in a manner suitable for a small conference call with dynamic participation by the involved parties.

The policy manager 200 may set media policy, which may function to determine the relevance of a track in the context of a specific use-case. Media policies preferably involve some kind of media analysis. Examples of media policies may include speaker policy mode, movement activity policy mode, presence activity policy mode, and/or other suitable types of policies or combination of such policies.

A speaker policy mode can set the priority of the media tracks of a specific publishing source (e.g. participant) based at least in part on the participant's speaking activity. This could be determined through audio analysis and/or video analysis. Media track priority may be adjusted based on real-time speaker detection, history of speaking, and properties of the speech. For example the tone, content, volume, and/or other factors related to speech detection can be used.

A movement activity policy mode can set the priority of the media tracks of a specific publishing source based at least in part on the presence, degree, and possibly type of movement on the source's video track or other type of media track. This may be used to change priority of media tracks in response to visual activity in a video track.

A presence activity policy mode can set the priority of the media tracks of a specific publishing source based at least in part on the presence of a specific object or property on the media tracks (e.g. presence of a face, presence of a car, etc.). This may be used to depend on the presence of a human in a human video stream. In a related example, policy may depend on various factors related to the presence of the detected object(s). For example, the size of a human face can be a factor. In some use-cases, presence activity policy may deprioritize video tracks with people far from the camera.

The policy manager 200 will preferably impact policy dependent track priorities. Track priorities preferably indicate the priorities of the different media tracks as established by the applied policies.

In one implementation, speaker activity, movement activity, presence activity, and/or other factors may be determined by the system through processing and analyzing a media track. This analysis can determine one or more properties on which a policy mode may be defined. Track analysis may be facilitated by a media manager 322 or any suitable system component. In another variation, media track factors may be communicated through a data signaling communication transmitted by a client device or an outside computing device and received at the system (e.g., the policy manager 200).

Policy records can be preset or preconfigured so that they are enabled when establishing the communication link. Policy records may alternatively be set, changed, removed, or otherwise mutated during a communication session.

The policy manager 200 preferably includes a policy data storage system (e.g., a database system) used to store and maintain records of the policy. Policy records, which are machine-storable data records defining policy properties and rules, may be stored and associated with an account, a sub-account, communication session, a participant, or with any suitable scope.

Additionally or alternatively, the policy manager 200 may include or interface with an application programming interface (API) or another suitable programmatic interface. An API is preferably used by outside parties in specifying policy.

The application programming interface (API) service 210 functions as a programmatic mechanism through which external entities can manage account settings, communication sessions, participants, individual communication links, and/or other aspects.

An API service is preferably a RESTful API but may alternatively be any suitable API such as SOAP, GraphQL, or custom protocol. The RESTful API works according to an application layer request and response model. An application layer request and response model may use an HTTP-based protocol (HTTP or HTTPS), SPDY, or any suitable application layer protocol. Herein, HTTP may be used, but should not be interpreted as being limited to the HTTP protocol. HTTP requests (or any suitable request communication) to the communication platform preferably observe the principles of a RESTful design. RESTful is understood in this document to describe a Representational State Transfer architecture as is known in the art. The RESTful HTTP requests are preferably stateless, thus each message communicated contains all necessary information for processing the request and generating a response. The API service can include various resources, which act as API endpoints that can act as a mechanism for specifying requested information or requesting particular actions. The resources can be expressed as URI's or resource paths. The RESTful API resources can additionally be responsive to different types of HTTP methods such as GET, Put, POST and/or DELETE. Information about a conversation is preferably stored and made accessible through conversation API resources. Alternative types of APIs may use different approaches for organization programmatic interactions with the communication system 100.

The bandwidth management system 300 functions to set or determine dynamic bandwidth for a communication link. The bandwidth management system 300 can function as an intelligent dynamic selective forwarding unit that manages, clones, routes and processes media tracks based on a number of application dependent configurations. The bandwidth management system 300 may be implemented within a single computing device (e.g., a server) or virtual machine. The bandwidth management system 300 may alternatively comprise of multiple computing resources including various forms of hardware, software, and/or virtualized resources. The bandwidth management system 300 can preferably be applied to each individual communication link. In some variations, the bandwidth management system 300 may coordinate bandwidth management ad routing of media tracks across communication links across multiple communication links of the same communication session. Additionally, the bandwidth management system 300 may coordinate bandwidth management and routing of media tracks across communication links of one or more communication links for different communication sessions in parallel.

The bandwidth management system 300 preferably sets bandwidth allocation settings based on a variety of settings including application-dependent configuration, media limitations, bandwidth availability, and/or other factors. As shown in FIG. 3, one preferred variation of the bandwidth management system 300 includes: a track priority manager 310, which sets priority of media tracks based on various factors; a media bandwidth manager 320, which sets media track related constraints used in determining bandwidth allocation; a bandwidth assignment manager 340, which applies an algorithm to assess track priority, constraints, bandwidth, and/or other properties in setting bandwidth allocation for a set of media links; and a bandwidth allocator 350. The bandwidth management system 300 may additionally include a bandwidth estimator 330 which can predict or supply bandwidth data used by the bandwidth assignment manager 340 when setting bandwidth allocation.

Figure 4:
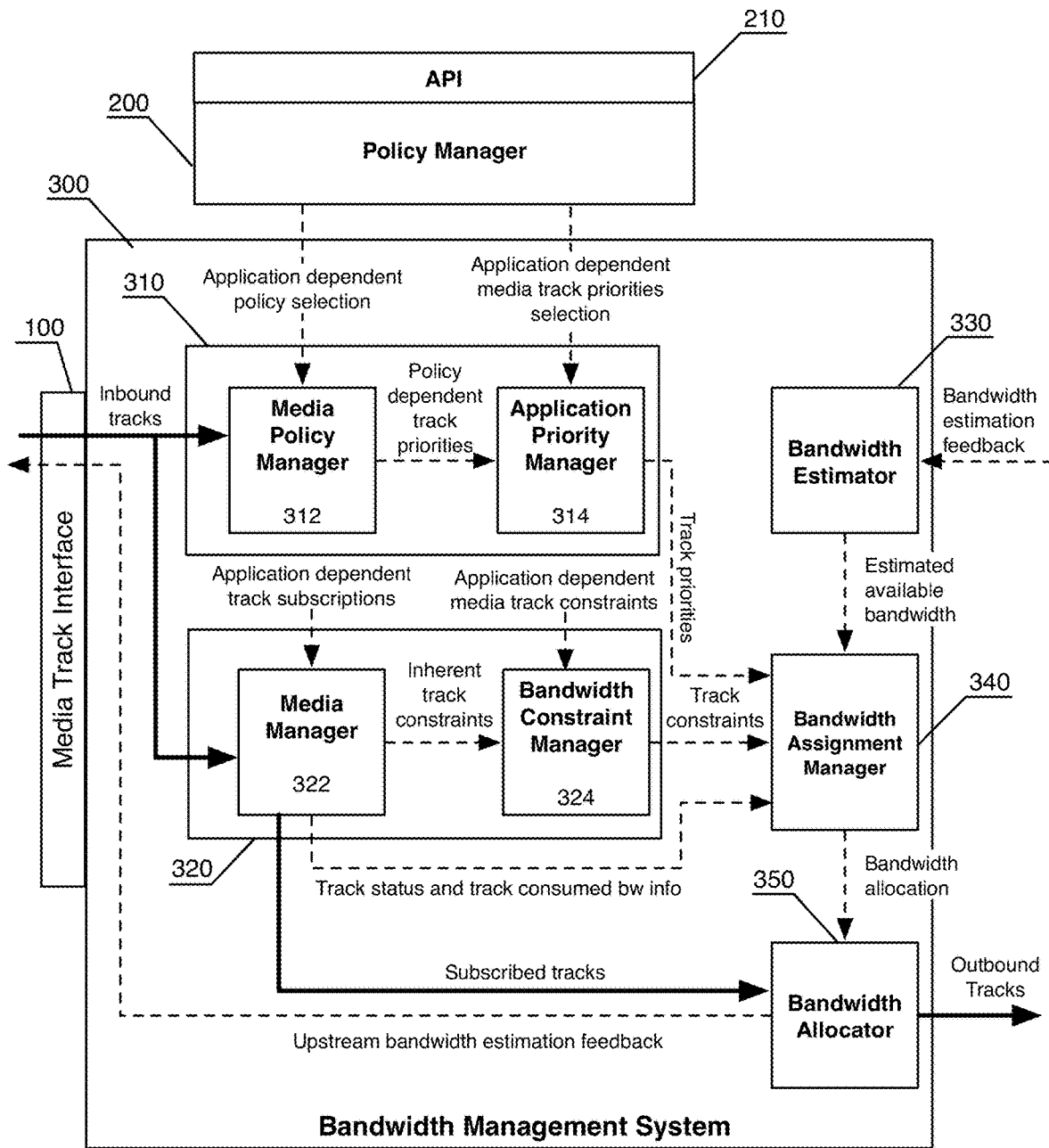

The track priority manager 310 functions to account for policy settings. The track priority manager 310 can be communicatively connected to the policy manager 200, wherein the policy manager 200 preferably transmits or communicates policy information to the track priority manager 310, and the track priority manager 310 includes machine configuration configured to implement the policy and set priority of the media tracks. In one variation, the track priority manager 310 includes a media policy manager 312 and an application priority manager 314 as shown in FIG. 4. The media policy manager 312 preferably generates track priorities based on media analysis. The application priority manager 314 preferably processes the track priorities along with the application-dependent configuration to generate effective track priorities. The effective priorities are preferably used as the output of the track priority manager 310 and processed by the bandwidth assignment manager 340.

The media policy manager 312 functions to adjust track priority based on properties and/or content of the media track. The media policy manager 312 preferably applies one or multiple media policies to set the relevance of a track in the context of a specific use-case. The media policy manager 312 preferably includes or connects to a media analysis component. As described above, exemplary media-related policies can include a speaker policy mode, a movement activity policy mode, and/or a presence activity policy mode. Policy configuration can include property (or properties) set to activate or trigger activation of one or more of these modes.

In a speaker policy mode, the media policy manager 312 is configured to set the priority of the media tracks of a specific publishing source (e.g. participant) based at least in part on the participant's speaking activity. This could be determined through audio analysis and/or video analysis. Media track priority may be adjusted based on real-time speaker detection, history of speaking, and properties of the speech. For example the tone, content, volume, and/or other factors related to speech detection can be used.

In a movement activity policy mode, the media policy manager 312 is configured to set the priority of the media tracks of a specific publishing source based at least in part on the presence, degree, and possibly type of movement on the source's video track or other type of media track. This may be used to change priority of media tracks in response to visual activity in a video track.

In a presence activity policy mode, the media policy manager 312 is configured to set the priority of the media tracks of a specific publishing source based at least in part on the presence of a specific object or property on the media tracks (e.g. presence of a face, presence of a car, etc.). This may be used to depend on the presence of a human in a human video stream. In a related example, policy may depend on various factors related to the presence of the detected object(s). For example, the size of a human face can be a factor. In some use-cases, presence activity policy may deprioritize video tracks with people far from the camera.

The media policy manager 312 is preferably responsive to policy that is application dependent. In some variations, communication sessions of each account and/or each communication session may have customized media-property related policy configured, which is applied by the media policy manager 312.

The output of the media policy manager 312 is preferably a set of media-related priorities. In one implementation priorities may be characterized by ordering the media tracks from highest priority to lowest priority. In anther implementation, a priority rating can be assigned to each inbound media track.

The application priority manager 314 functions to set track priority based in part on application or use-case specific conditions. The policies used in setting the priorities in the application priority manager 314 are based on outside factors. The application priority manager 314 preferably applies one or multiple contextual policies to set the relevance of a track.

Information provided by the application or an end-user/participant client device may indicate or be used in setting the priority of the different media tracks. This may be used so that unique usage and context of a specific application or use-case can be accounted for.

In one variation, the application priority manager 314 may directly set the priority of one or more tracks based on external input. For example, a client device viewing a video track at a greater size may result in that video track being set with the highest priority when sending in a communication link to that particular client device. In another example, an application that has a set of pre-defined participants as having more importance (e.g., moderators of a conference call) than another set of participants can have the high priority participants' priority set by the application priority manager 314. In some variations, the application priority may act as an override of media-related priority.

In another variation, the application priority manager 314 may indicate prioritization of one or more tracks and this may be used in adjusting the priority used in managing bandwidth. This may enable the relevant priority of tracks to balance media-related priority and application-directed priority.

The output of the application priority manager 314 may provide a second set of application-based track priority properties. In one variation, the application-based track priority properties may be in addition to a set of media-related priorities. In another variation, a generalized set of track priorities may be generated by assessing application-based track priorities and media-related priorities.

The media bandwidth manager 320 functions to account for media functionality and limitations. Different forms of media may have different bandwidth dependent options, and the media bandwidth manager 320 preferably incorporates such limitations and preferences. The output of the media bandwidth manager 320 is preferably a set of constraints for the set of media links. The constraints may include a bandwidth minimum and/or maximum for one or more media tracks. Bandwidth constraints may be set based on the media format, media type, codec, or other media-related property. A bandwidth constraint may alternatively be set based on application-specific prioritizes (e.g., use case of the application or settings/state of an end-user client).

A bandwidth minimum will generally be set at a level below which the media may not be adequately rendered by a client device. A bandwidth maximum may be set at a threshold above which the incremental improvements in quality are diminished or have no significant difference to the media link. The media constraints may be based on media-related properties and/or application-dependent properties.

In one variation, the media bandwidth manager 320 includes a media manager 322 and a bandwidth constraint manager 324 as shown in FIG. 4.

The media manager 322 functions to provide media-related constraints. Media-related constraints may be inherent track related constraints. Media-related constraints preferably include the minimum track bandwidth and maximum track bandwidth. The minimum track bandwidth and maximum track bandwidth for each track may be determined by analyzing the media format, media type, codec, or other media-related properties. As one example, in an SVC encoded video track, the minimum track bandwidth may be the bandwidth of the lowest quality layer that can be extracted from the inbound SVC track. The media-related maximum track bandwidth is the threshold at which allocating more than the maximum bandwidth to the relevant track would not make the track consume more bandwidth and/or alter the media quality.

The media manager 322 preferably generates inherent track constraints based in part on the media links. In some variations, the media manager 322 may additionally include configuration to perform the media cloning, routing and processing required by SFU logic when the system is being used as a dynamic SFU.

The bandwidth constraint manager 324 functions to incorporate application-dependent configuration in setting media link constraints. The bandwidth constraint manager 324 preferably takes in the inherent track constraints and application-dependent configuration to determine resulting track constraints.

In a preferred variation of the system, the bandwidth management system 300 includes a bandwidth estimator 330, which functions to estimate effective available bandwidth within a link. The bandwidth estimator 330 preferably takes in bandwidth estimation feedback reported back from the subscribers, reported through the communication links, or received from any suitable source. The bandwidth estimation feedback is preferably information regarding the constrained bandwidth link status that makes it possible to estimate the available bandwidth link.

In one implementation, the bandwidth estimator 330 operates in coordination with a client device service. The client device service is a software or hardware implemented component that transmits bandwidth information directly or indirectly to the bandwidth estimator 330 or to another component of the system. The client device service can be implemented through an application, SDK (software development kit), library, or other software service. Alternatively, client devices interfacing with the system may voluntarily comply with a protocol and provide bandwidth estimations.

The client device services may additionally provide other client device input such as end user media track usage and interactions, which can be used in updating the policy manager 200, the track priority manager 310 and/or the media bandwidth manager 320.

The bandwidth assignment manager 340 functions as a form of optimizer that assigns bandwidth allocation settings to be put into place by the bandwidth allocator 350. The bandwidth assignment manager 340 preferably takes in track priorities from the track priority manager 310, track constraints from the media bandwidth manager, and bandwidth availability from the bandwidth estimator 330. The bandwidth assignment manager 340 may additionally take in track status and track consumed bandwidth information, which may be reported from the media manager or any suitable system. The bandwidth assignment manager 340 preferably outputs bandwidth allocation settings. The bandwidth allocation settings are preferably a data model representing the settings for allocating bandwidth when sent to one or more participants. The bandwidth assignment manager 340 can preferably coordinate multiple factors to appropriately act on the various constraints.

The bandwidth assignment manager 340 and more generally the bandwidth management system 300 are preferably configured to evaluate the media track factors (e.g., media track priority, constraints, and available bandwidth) in accordance with a set of conditions. Those conditions may define a set of rules that define how bandwidth is allocated.

In one implementation, the bandwidth assignment manager 340 can include machine instructions that when executed are configured to: maximize the sum of bandwidth consumed by all media tracks; verify a given link does not consumer more than the available bandwidth; verify that no tracks are over their respective maximum; verify all tracks are over their minimum or are switched off; activate a switched off track to be switched on if all the higher priority tracks have been allocated their required maximum during a certain time; and regulate bandwidth allocation such that bandwidth allocation follows priorities. Additional or alternative sets of conditions may alternatively be configured in the bandwidth assignment manager 340.

The bandwidth allocator 350 functions to apply determined bandwidth settings to media tracks to a subscriber. The bandwidth allocator 350 preferably takes one or more subscribed tracks and communicates those tracks through a constrained bandwidth link to one or more specified subscribers with adjusted outbound track bandwidth settings. The bandwidth allocator 350 preferably takes the bandwidth allocation settings of the bandwidth management system 300 and the media tracks and modifies the media tracks to the bandwidth allocation settings. This can include setting minimum bandwidth, maximum bandwidth, enabling/disabling video, enabling/disabling audio, and/or making any suitable change. A constrained bandwidth link preferably refers to a packet-switched network connection (e.g. an IP connection) where a number of outbound tracks are transported towards a subscriber. The network link underlying this connection may have constrained (i.e. limited) capabilities in terms of bandwidth, jitter, packet loss, and/or other constraints. Outbound tracks refer to the tracks bundled and transported through the constrained bandwidth connection and link towards its destination. A subscriber refers to a client-side application, service, or device usually under the control of an application end-user, where the media tracks are rendered.

Method

Figure 5:
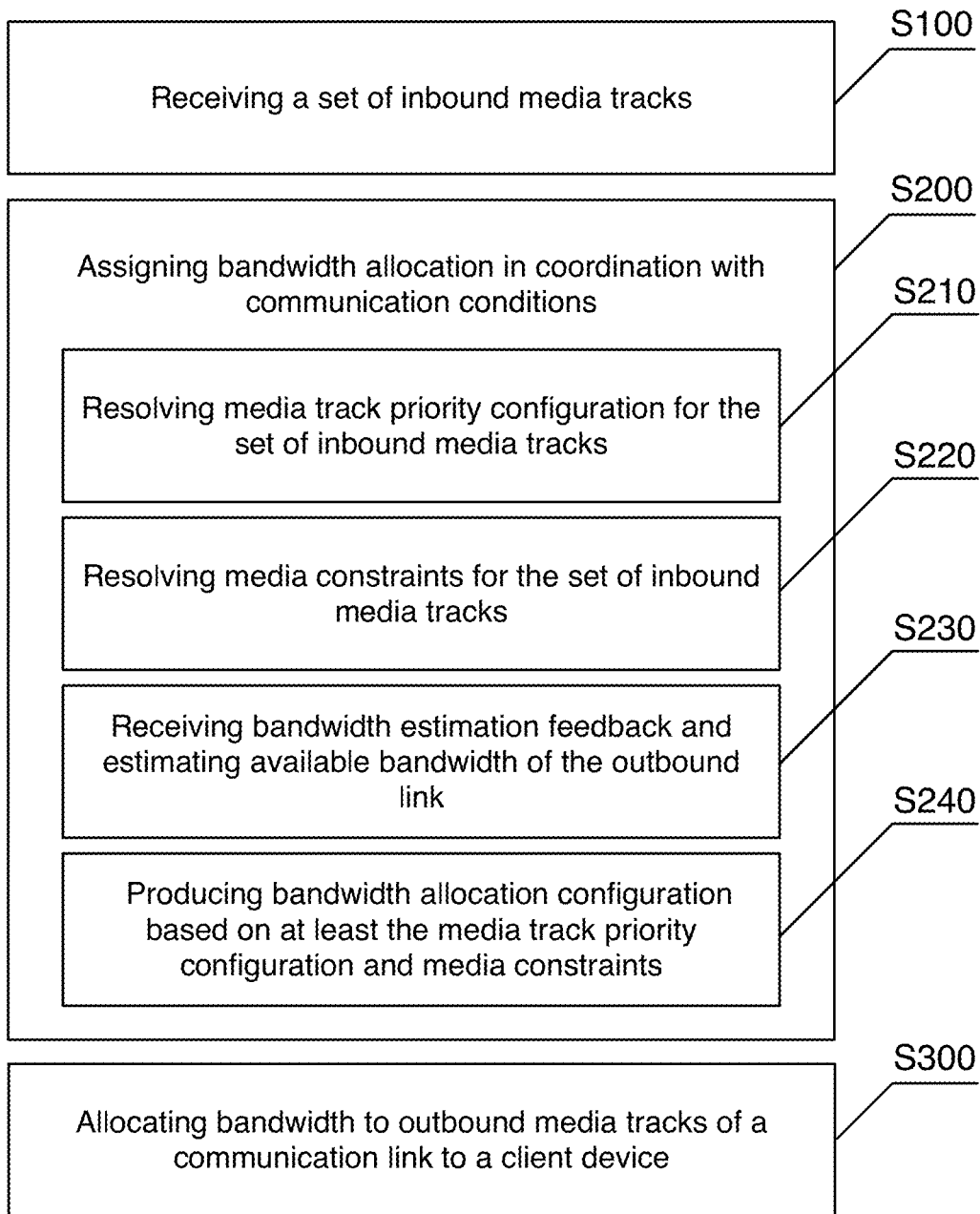
FIG. 5 is a flowchart representation of a method for intelligent bandwidth allocation.

As shown in FIG. 5, a method for intelligent bandwidth allocation on multi-track multimedia communication systems of an embodiment can include receiving a set of inbound media tracks S100, assigning bandwidth allocation in coordination with communication conditions S200, and allocating bandwidth to outbound media tracks of a communication link to a client device S300. Assigning bandwidth allocation preferably additionally includes resolving media track priority configuration for the set of inbound media tracks S210, resolving media constraints for the set of inbound media tracks S220, producing bandwidth allocation configuration based on at least the media track priority configuration and media constraints S240. The method may additionally include receiving bandwidth estimation feedback and estimating available bandwidth of the outbound link S230, which can be integrated with producing bandwidth allocation configuration in S240. The method is preferably implemented by a system such as the one described above, but any suitable system may alternatively be used.

Block S110, which includes receiving a set of inbound media tracks, functions to collect or otherwise obtain inbound tracks intended for at least one subscriber. There is generally a plurality of inbound media tracks, which may originate from various participants. The source of a media track may also be a subscriber. Preferably, the various sources of media tracks direct the media tracks to a central service such as some communication platform, where the intelligent bandwidth allocation can be applied before sending to a subscribing participant. In the case of a video conferencing tool, the various participants that have audio and/or video enabled upload a media track (e.g., video and/or audio stream) to a system with the allocation service.

In one variation, the inbound media tracks are preferably video media tracks from a set of participants. In another variation, the inbound media tracks are audio media tracks. As discussed herein, the media tracks may be a variety of types of media tracks. The type of media tracks may be substantially across the participants (e.g., all audio), but in some instances or variations, the media tracks can be from a set of possible types of media tracks (e.g., video, audio, screencast, etc.).

In one variation, receiving an inbound media track is achieved over a communication link between the bandwidth management system (or more specifically a media track interface of the system) and a participant client device. The communication link may additionally be used in transmitting the outbound media tracks to be delivered to participant. In a WebRTC implementation, the inbound media track can be a media track uploaded over an RTCPeerConnection.

Block S200, which includes assigning bandwidth allocation in coordination with communication conditions, functions to process a set of factors related to the media link, the communication link, and the current usage context. Assigning bandwidth allocation preferably determines per-track communication settings for transmission to a client device of a participant based on a number of conditions. Assigning bandwidth allocation preferably assigns the bandwidth allocation according to application-dependent configuration, media track constraints, and the available bandwidth for a subscriber. Application-dependent policy can be used in combination to determine the bandwidth allocation intended for tracks of a link. Additionally or alternatively, real-time conditions of a client device of a participant and/or application context can be measured and used in changing media bandwidth allocation.

As mentioned above, assigning bandwidth allocation in coordination with communication conditions S120 can additionally include resolving media track priority configuration for the set of inbound media tracks S210, resolving media constraints for the set of inbound media tracks S220, and producing bandwidth allocation configuration based on at least the media track priority configuration and media constraints S240. More preferably, assigning bandwidth allocation includes resolving media track priority configuration for the set of inbound media tracks S210, resolving media constraints for the set of inbound media tracks S220, receiving bandwidth estimation feedback and estimating available bandwidth of the outbound link S230, and producing bandwidth allocation configuration based on at least the media track priority configuration and media constraints S240.

Block S210, which includes resolving media track priority configuration for the set of inbound media tracks, functions to set track priority preferences. The priority setting of the set of media tracks can later be used in assessing which media tracks to prioritize when allocating bandwidth. Higher priority will generally be used to indicate that the media track is deserving of greater bandwidth allocation while lower priority will generally indicate lower incentive for bandwidth allocation. The track priority settings can be based at least in part on settings provided by an external entity or system. The priority may be application-dependent, which may mean the priority changes in response to media of an application-related conversation and/or may mean the priority changes in response to external indicators of priority from a managing account or a signal received from a client device.

Application dependent track priorities can be customized for the particular use-case to set priorities that are appropriate for that use-case. In a CaaS computing platform, it can be highly beneficial to provide flexibility for an application using the services to customize performance for their use-case. Priorities may be based on associated-participants (e.g., the origin of a media track), activity in the media (e.g., speaker detection, motion detection, person/object presence, etc.), and/or any suitable media-track property. Application dependent track priorities can additionally be altered at any suitable time. Alternatively, the track priority configuration can be specified when establishing the communication link.

In one variation policy can be used in part in determining media track priority configuration. The method may include receiving and setting policy configuration and resolving media track priority configuration based in part on the policy. Policy may explicitly set media track priority for one or more media tracks or set configuration used in directing modes of priority assessment. Policy can be set through account settings, wherein the same priority is applied to multiple communication links associated with the account. In another variation, policy may be set for a particular communication session (e.g., multiple links involved in a shared communication or application session). Policy could additionally or alternatively be set per subscriber. Policy could additionally be set at different scopes and policy interpretation can appropriately determine an effective policy based on various policy-overwriting rules.

Application-dependent policy may be used to set priority configuration to specify publish/subscribe information, quality control information, media processing information, track priorities, participant priorities, and/or other factors. The policy may additionally include media related policy such as various forms of policy dependent on media analysis such as speaker detection, presence detection, movement detection, and the like.

Figure 6:
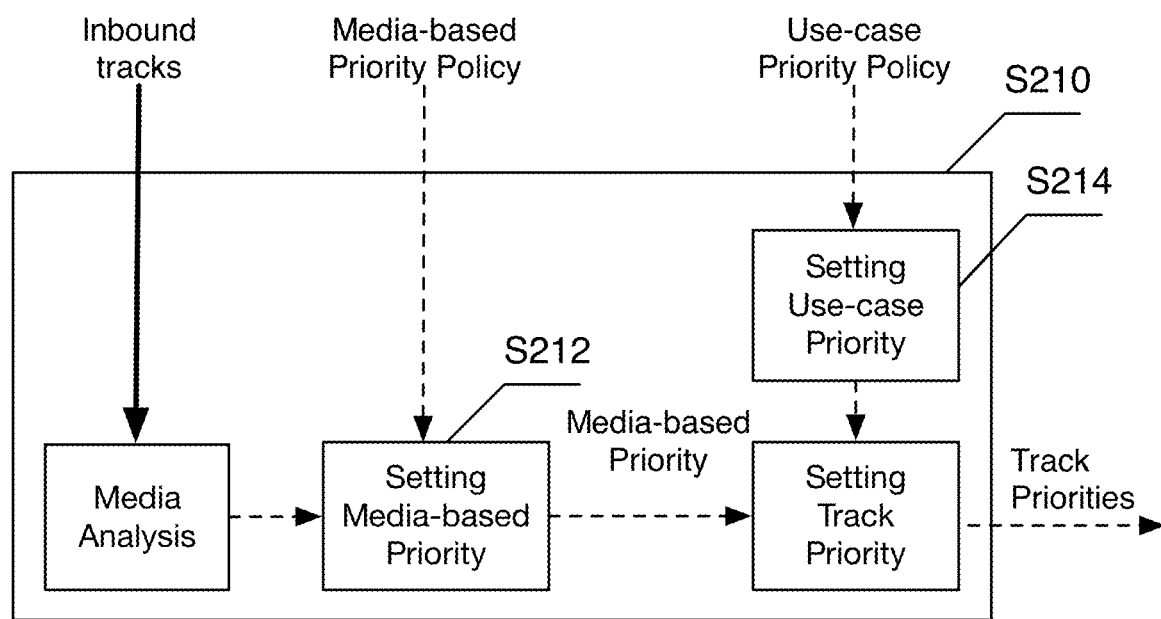
FIG. 6 is a schematic representation of a variation of resolving track priority.

In one preferred variation, resolving media track priority configuration preferably includes setting media-based track priority S212 and/or setting use-case track priority S214 as shown in FIG. 6.

Block S212, which includes setting media-based track priority, which functions to customize the priority of a media track based on properties and conditions of the media. Setting track media based priority may include processing and/or analyzing the media tracks and setting a media-based track priority for each media track. Processing and/or analyzing the media track can include performing computer vision for video or image processing of a video or image based media track. Processing and/or analyzing the media track can include performing speech recognition, speech analysis, or other forms of audio analysis for a media track with audio media.

In one variation, the method may include setting media-based track priority based on at least one policy mode. One or more policy mode may be configured or selected from a set of modes that can include a speaking activity mode (e.g., speaker detection), a movement activity mode (e.g., movement detection), and presence activity mode (e.g., presence detection).

In a speaker policy mode, resolving media track priority can include processing audio of the media track and setting priority in response to audio analysis. Processing of audio is preferably performed for at least a subset of the media tracks and preferably all media tracks in many cases. Processing audio may include detecting the presence of sounds, detecting spoken words (e.g., to prioritize), detecting noise or non-spoken audio (e.g., to deprioritize) converting speech to text for natural language processing, detecting and analyze the content of the speech, analyzing sentiment of audio or otherwise classifying tone of audio, and/or performing any suitable form of audio analysis. Processing of audio is preferably applied in detecting speaking activity in a media tracks and rating level of speaking activity relative to other media tracks. The results of audio analysis are preferably used in setting priority of a media track. Media track priority may be adjusted based on real-time speaker detection, history of speaking, and properties of the speech. For example the tone, content, volume, and/or other factors related to speech detection can be used.

In a movement activity policy mode, resolving media track priority can include analyzing movement in video content of a media track and setting priority in response to the video analysis. Analyzing movement may include performing computer vision or other suitable video/image processing techniques in determining presence of movement, detecting human motion, classifying type of movement, and/or otherwise analyzing the visual activity in video content of a media track. The movement activity and more generally the visual activity detected in a media track may be used in setting priority of a media track.

In a presence activity mode, resolving media track priority can include analyzing object presence in a media track and setting priority in response to object presence. Presence activity can be a variation of video analysis and will preferably include performing computer vision or other suitable video/image processing techniques in detecting presence of a specific object or a type of object presence in the video content of a media track. Object detection can be used in detecting presence of a face. Video/image processing may further be used in characterizing or providing analysis of the properties of the detected object such as detecting and characterizing human attention (e.g., direction of attention), detecting speech visually (e.g., detecting mouth movement), and other suitable forms of presence detection. Object presence and in particular human presence may be used in setting priority of a media track.

Block S214, which includes setting use-case track priority, functions to adjust priority in response to various application-dependent factors. Use-case track priority can be set in response to an outside indicator. Setting of use-case track priority can be set in response to state of preconfigured policy, detected feedback from a client device, a programmatic update to policy from a managing account, and/or other factors. Use-case track priority in one variation can be explicit setting of priority where the priority of one or more media tracks are directly set, which may override media-based priority or other prioritization. Use-case track priority in another variation may alternatively weight or apply a modification to priority of a media track, which may emphasize or deemphasize a priority setting from media-based priority. For example, a key participant may have priority weighted so that any activity by the key participant is given greater priority to less involved participants.

In one preferred approach, setting output media track priority can include setting an initial priority based on media-based priority of each media track and overriding the media-based priority with use-case priority for individual media tracks where an explicit use-case priority is set.

Priority configuration may additionally be specified by indication of a pre-configured mode. A pre-configured mode will preferably come with a set of pre-configured settings. Exemplary modes may include a grid-video chat mode, a presentation mode, and collaboration mode, which are described herein. Specifying a pre-configured mode may set application-dependent priority configuration. Some or a portion of the default configuration properties of a pre-configured mode may be overwritten. A managing account for a communication session can preferably programmatically set a pre-configured mode prior to or at the initiation of a new communication session. Alternatively a pre-configured mode can be initiated or changed during a communication session.

Block S220, which includes resolving media constraints for the set of inbound media tracks, functions to set media track limits based on media properties or external factors. Media constraints may be inherent media track constraints based on the media format. Media constraints may additionally or alternatively be external media constraints, which may limits supplied by an outside system or entity. For example, an application may Inherent media track constraints are preferably derived or set for each media track based on the properties of the media track. In other words, for the set of inbound media tracks, resolving media constraints can include analyzing the media properties for each media track and setting media constrains for each media track. Each inbound media track may be communicated from the source participant in different formats depending on the client device and/or other factors, which can alter media limitations per media track. For example, the media format may have a minimal bandwidth threshold (below which media fails or is unsatisfactory) or maximum bandwidth threshold (above which media quality does not improve or achieve sufficient improvements).

External media constraints may be set in response to application-dependent conditions, a participant client device, or other signals. In one variation, a managing account may configure media constraints for some or all participants and/or media tracks based on their particular use-case.

Resolving media constraints preferably includes determining a minimal bandwidth threshold and maximum bandwidth threshold derived from a media format of a media track. The minimum and/or maximum bandwidth thresholds may be based in part on inherent media track constraints and/or external media constraints.

Alternatively, media dimensions, resolution, and/or other media properties could be specified as an indirect approach to indicating bandwidth settings. Resolving media constraints may additionally include calculating minimum or maximum bandwidth or other communication factors for a media track based on other constraints such as bandwidth usage, but may additionally factor in media properties such as dimensions, bitrate, communication latency, communication jitter, and/or other suitable properties. In one variation, the used media dimensions of an application can be automatically detected and used in specifying the media bandwidth properties. For example, a library may be configured to automatically detect media dimensions displayed within an application or browser window and then to supply those dimensions. The media dimensions can be provided during negotiation and setup of media communication. Additionally and/or alternatively, the media dimensions can be delivered during a media communication such as when the display of media changes in response to a user interface change.

Block S230, which includes receiving bandwidth estimation feedback and estimating available bandwidth of the outbound link S230, functions to use bandwidth feedback from one or more participants/subscribers. Receiving bandwidth estimation feedback preferably involves a client device transmitting bandwidth or other forms of communication information to the bandwidth management system, and correspondingly, at the bandwidth management system receiving the bandwidth estimation feedback. Bandwidth estimation may additionally or alternatively use historical or predictive techniques, which can include predicting bandwidth conditions for one or more participants subscribing to outbound media tracks transmitted in block S300. For example, historical bandwidth availability feedback collected for an account may be used in estimating available bandwidth in the case where no or only a limited number of subscribers report bandwidth usage.

Some variations of the method may not include or use bandwidth estimation or may only use bandwidth estimation for a subset of participants.

Block S240, which includes producing bandwidth allocation configuration based on at least the media track priority configuration and media constraints, functions to process various objectives, preferences, and limitations around the media tracks for a given communication link. The bandwidth allocation configuration preferably characterizes how bandwidth can be allocated when transmitting media tracks in a communication link. Preferably, block S240 processes track priorities, media constraints, and optionally bandwidth availability estimation. In general, producing bandwidth allocation configuration functions to generate an optimized or at least a preferable bandwidth setting for a given number of media tracks transmitted to a particular participant (e.g., a subscriber to a set of media tracks).

In implementation, block S240 is used in generating individual bandwidth allocation configurations for a set of participants that are subscribers to or destinations of the outbound the media tracks. Accordingly, producing bandwidth allocation configuration can include, for each participant in a set of participant, producing bandwidth allocation configuration based on media track priority configuration and the media constraints for each participant. Each participant may have media tracks individually prioritized and/or particular media constraints. For example, two different participants may indicate, through user interaction on their client device, different media tracks of primary interest, which could result in different prioritization of those two media tracks. In another example, two different participants may have different hardware/software limitations such that media constraints are different for each participant.

In variations including block S230, where an estimation of available bandwidth is generated for one or more receiving participants, producing a bandwidth allocation configuration can further be based on available bandwidth. Accordingly, bandwidth allocation for a set of media tracks in a communication link to a participant will depend on the track priority configuration and media constraints of each media track and the estimated available bandwidth of a communication link to the participant.

Producing bandwidth allocation configuration preferably includes periodically or continuously updating the bandwidth allocation configuration. Updates may be done in response to changes in priority, constraints, bandwidth estimation, participants, media tracks, and/or any suitable factor.

Preferably, producing bandwidth allocation attempts to maximize bandwidth allocation for bandwidth based on the various factors. In general, different media tracks will be allocated different bandwidth settings based on priority, media limitations, and bandwidth availability. Herein, maximizing and minimizing preferably characterize general increase and decrease of an effective metric. Preferably, maximizing and minimizing includes achieving a local maximum or minimum within some window (e.g., seconds, minutes, etc.). However, the use of descriptors such as maximum, minimum, or optimize herein does not limit the method to theoretical metrics and, one could appreciate that achieving near-maximum or near-minimum or any suitable change that trends in that direction may have corresponding benefits.

Figure 7:
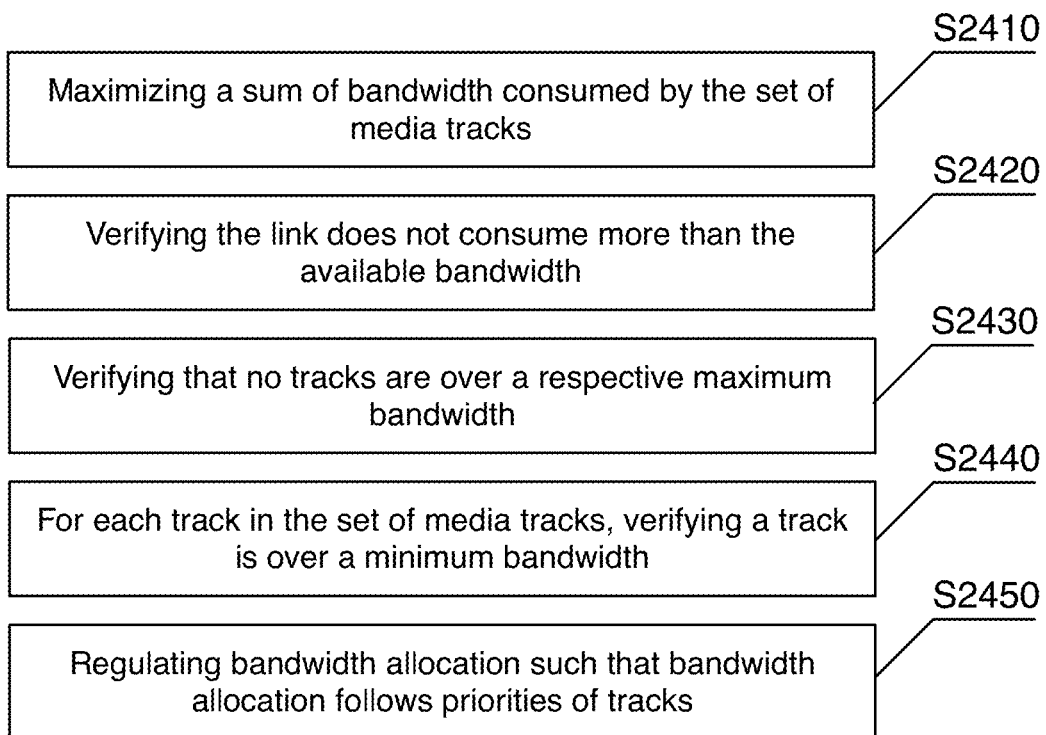
FIG. 7 is a flowchart representation of one variation for producing bandwidth allocation configuration.

In one preferred implementation, the process of producing bandwidth allocation applies a series of processes that effectively enables a number of conditions to be considered and used in configuring the bandwidth allocation. In a preferred variation, producing bandwidth allocation maximizes the bandwidth consumed by the tracks. More specifically, producing bandwidth allocation configuration can include applying a series of processes that comprise a combination of processes such as: maximizing a sum of bandwidth consumed by the set of media tracks S2410; verifying the link does not consume more than the available bandwidth S2420; verifying that no tracks are over a respective maximum bandwidth S2430; for each track in the set of media tracks, verifying a track is over a minimum bandwidth S2440; and/or regulating bandwidth allocation such that bandwidth allocation follows priorities of tracks S2450 as shown in FIG. 7.

Block S2410, which includes maximizing sum of bandwidth consumed by all media tracks, functions to collectively use the maximum permitted bandwidth allowed across all the media tracks. For example maximizing sum($Bwa\_i$) where $Bwa\_i$ is the bandwidth of a given media track i. In other words, block S120 takes the maximum value that complies with the rest of conditions.

Block S2420, which includes verifying a given link does not consume more than the available bandwidth functions to enforce the allocated bandwidth is achievable with the overall bandwidth limitations of the communication link. This can include verifying that sum($Bwa\_i$)<=BWE where BWE is the bandwidth estimate for the communication link. BWE may be based on the output of block S230.

Block S2430, which include verifying that no tracks are over their respective maximum, functions to enforce bandwidth maximum constraints. For example, verifying for each media track i in a set of media tracks: $Bwa\_i$<=$MaxBw\_i$.

Block S2440, which includes verifying all tracks are over their minimum or are switched off, functions to enforce bandwidth minimum constraints. For example, verifying for each media track i in a set of media tracks: $Bwa\_i$>=$MinBw\_i$ and if not then setting $Bwa\_i$=0 (i.e. switched-off). Other media changes may additionally be used such as changing encoding (e.g., altering compression, format, bitrate, frame rate, resolution, dimensions, etc.) or media type (e.g., converting video to audio only). Verifying that all tracks are over their minimum or are switched off preferably includes setting the track to a switched off state if the track is not over a minimum bandwidth and activating a track in the switched off state to a switched on state if all the higher priority tracks have been allocated a specified maximum bandwidth. Such on-off state evaluation may be evaluated periodically over certain time windows.

Block S2450, which includes regulating bandwidth allocation such that bandwidth allocation follows priorities, functions to follow priorities of media tracks. Following priorities preferably includes verifying that higher priority tracks always have higher allocated bandwidth (If $Priority\_i$>=$Priority\_j$, then $Bwa\_i$>=$Bwa\_j$), lower priority tracks are the first to be switched off, and the last to be switched on (e.g., if $Bwa\_i$=0, then there is no j so that $Priority\_j$<$Priority\_i$ having $Bwa\_j$>0), and non-constrained tracks share bandwidth in proportion to (e.g., a function f) of the priorities. In one variation of proportionally sharing bandwidth, a track with double priority can be allocated double bandwidth if the function is the identity function. For example, assuming that $MinBw\_i$<=$Bwa\_i$<=$MaxBw\_i$ and that $MinBw\_j$<=$Bwa\_j$<=$MaxBw\_j$, then $Bwa\_i/f(Priority\_i)=Bwa\_j/f(Priority\_j)$.

In one variation, track bandwidth allocation based on priority may follow a monotonic function of their priorities. For example, for the identity function, that means that tracks with double priority are assigned double bandwidth as long as they are within their constraint bounds. However, other suitable proportioning of bandwidth may be used.

In some variations Block S240 may include generating a learning model for bandwidth allocation such that bandwidth allocation configuration may be set based in part on trained AI/ML learning models.

Block S300, which includes allocating bandwidth to outbound media tracks of a communication link to a client device, functions to apply the assigned bandwidth allocation of block S240 to actual media communication. Allocation of bandwidth can preferably be updated in coordination with changes in bandwidth allocation configuration output by block S240. As one exemplary situation, different outbound media tracks will be allocated different amounts of bandwidth for a communication link to a subscriber. This may be used so that the current speaker and optionally other high priority participants are given proportionally more bandwidth while inactive or lower priority participants have their corresponding media tracks deprioritized.

Allocating bandwidth to outbound media tracks preferably includes transmitting media tracks through the outbound communication link to a participant using the allocated bandwidth. If a media track is turned off, then the media track may not be transmitted. In some variations, a placeholder image or asset may be transmitted to serve as a placeholder though a placeholder may alternatively be handled by the client device of the participant. As the method is preferably used in routing media to a plurality of participants, allocating bandwidth to outbound media tracks can include, for each communication link to a distinct participant in a set of communication links, transmitting the set of media tracks through the outbound communication link to the distinct participant and, for each media track, using the bandwidth specified in the bandwidth allocation configuration. Allocating bandwidth to outbound media tracks is preferably updated in real-time in response to changes in the bandwidth allocation configuration. Allocating bandwidth to outbound media tracks may include processing or encoding media tracks if changes are necessitated.

In the case of WebRTC, the communication link can be a communication link established through an RTCPeerConnection of the WebRTC protocol. Accordingly, allocating bandwidth to outbound media tracks within a communication link to a client device can include transmitting the media tracks within a WebRTC peer connection to a client device. That WebRTC peer connection, as in other forms of RTC communication channels, may also be used for receiving uploaded media tracks from the client device. Accordingly, receiving a set of inbound media tracks S100 may include receiving a media track from the client device through the WebRTC peer connection. Other suitable synchronous data stream connections may alternatively be used. In the case of video media tracks, the media tracks are transmitted as video streams in the communication link to the client device of the participant. In the case of audio media tracks, the media tracks are transmitted as audio streams in the communication link to the client device of the participant.

Architecture

Figure 8:
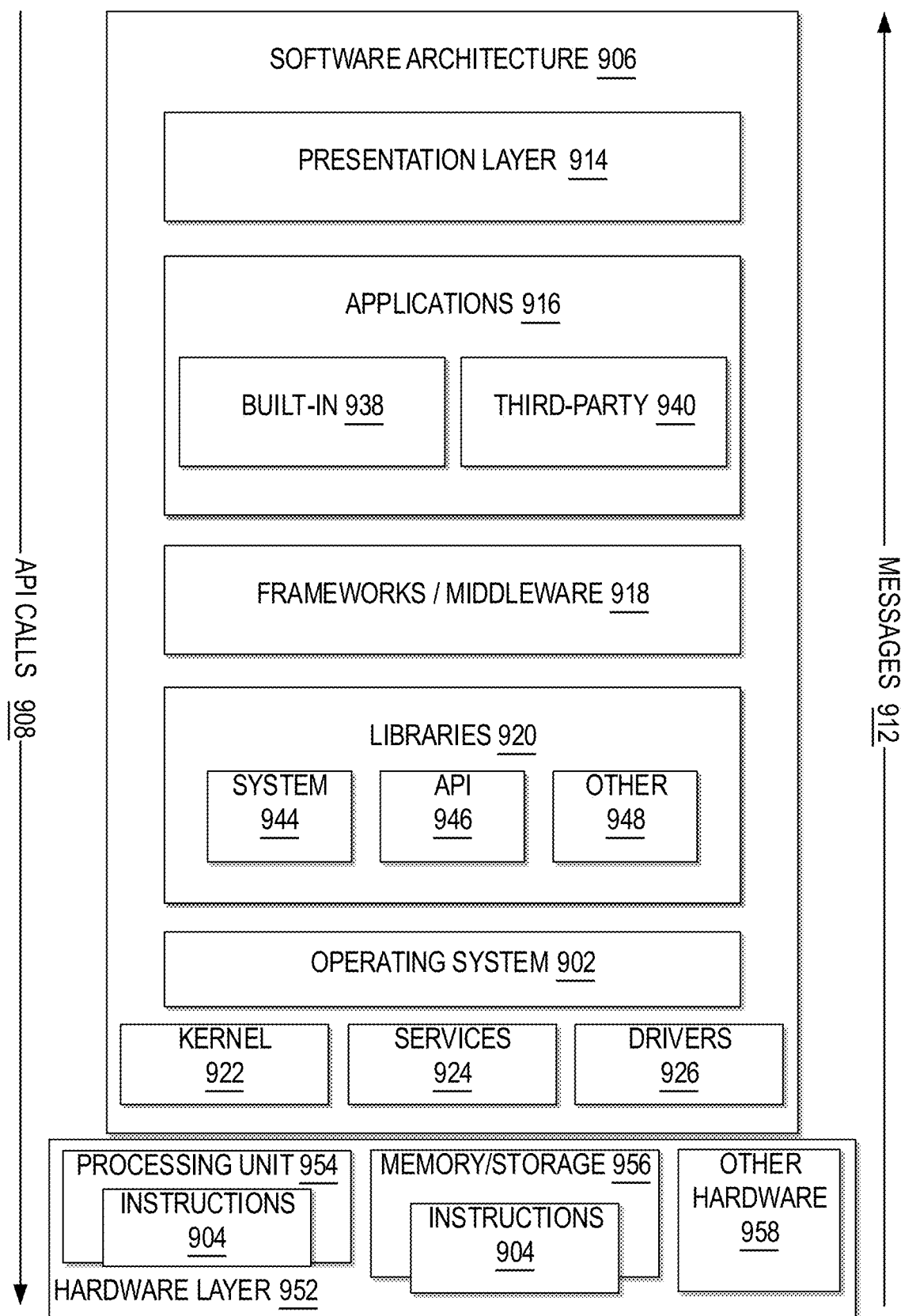
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating an example software architecture 906, which may be used in conjunction with various hardware architectures herein described. FIG. 8 is a non-limiting example of a software architecture 906 and it will be appreciated that many other architectures may be implemented to facilitate the functionality described herein. The software architecture 906 may execute on hardware such as machine 1000 of FIG. 9 that includes, among other things, processors 1004, memory 1014, and (input/output) I/O components 1018. A representative hardware layer 952 is illustrated and can represent, for example, the machine 1000 of FIG. 9. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules 956, which also have executable instructions 904. The hardware layer 952 may also comprise other hardware 958.

In the example architecture of FIG. 8, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke application programming interface (API) calls 908 through the software stack and receive a response such as messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924, and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphical user interface (GUI) functions, high-level resource management, high-level location services, and so forth. The frameworks/middleware 918 may provide a broad spectrum of other APIs that may be used by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 9:
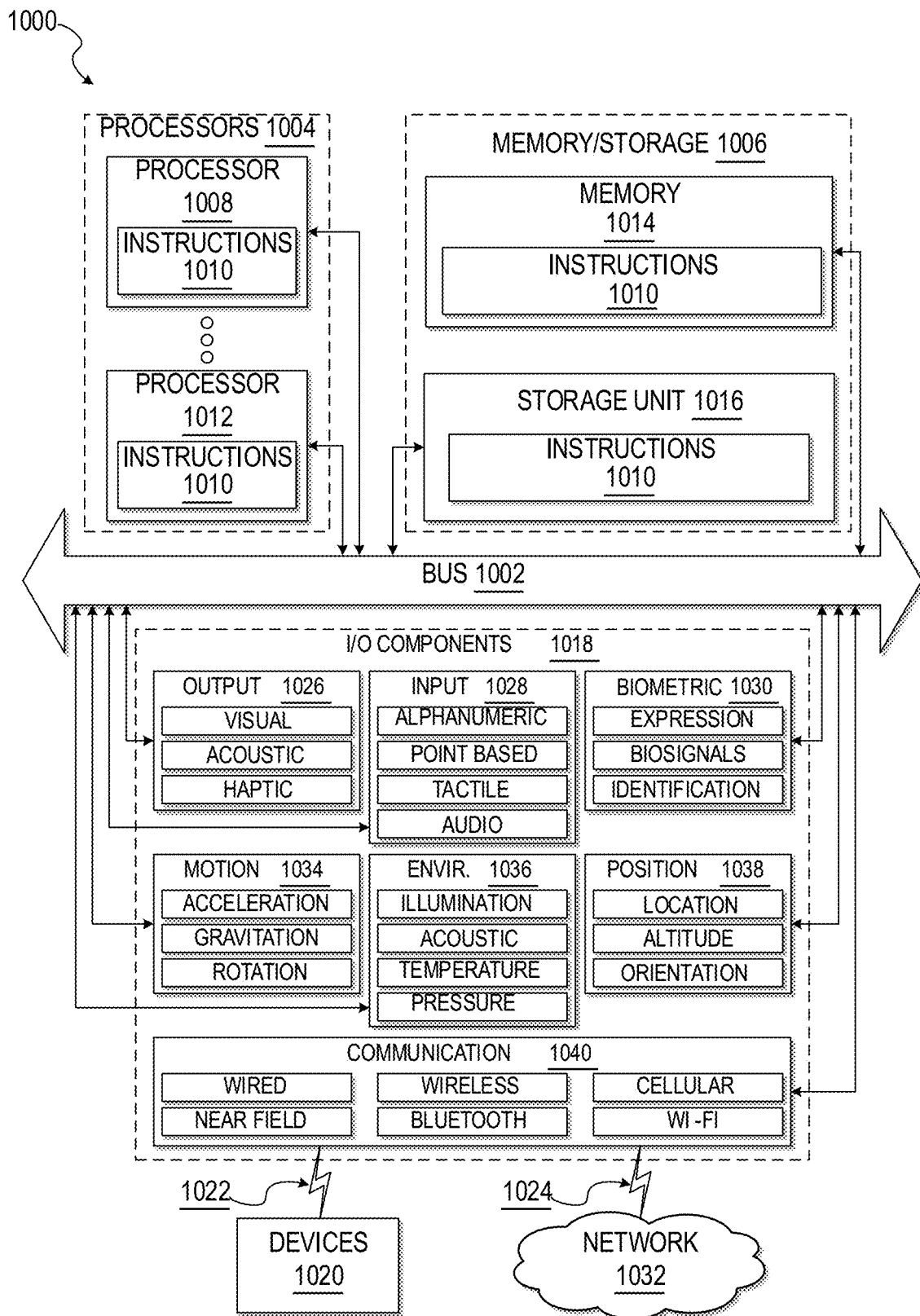
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 1000, according to some example embodiments, able to read instructions 904 from a machine-readable medium (e.g., a machine-readable storage medium) and perform any one or more of the methodologies discussed herein. Specifically, FIG. 9 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1000 capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 9. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1024 and coupling 1022, respectively. For example, the communication components 1040 may include a network interface component or other suitable device to interface with the network 1032. In further examples, communication components 1040 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 1010 for execution by the machine 1000, and includes digital or analog communications signals or other intangible medium to facilitate communication of such instructions 1010. Instructions 1010 may be transmitted or received over the network 1032 using a transmission medium via a network interface device and using any one of a number of well-known transfer protocols.

Figure 10:
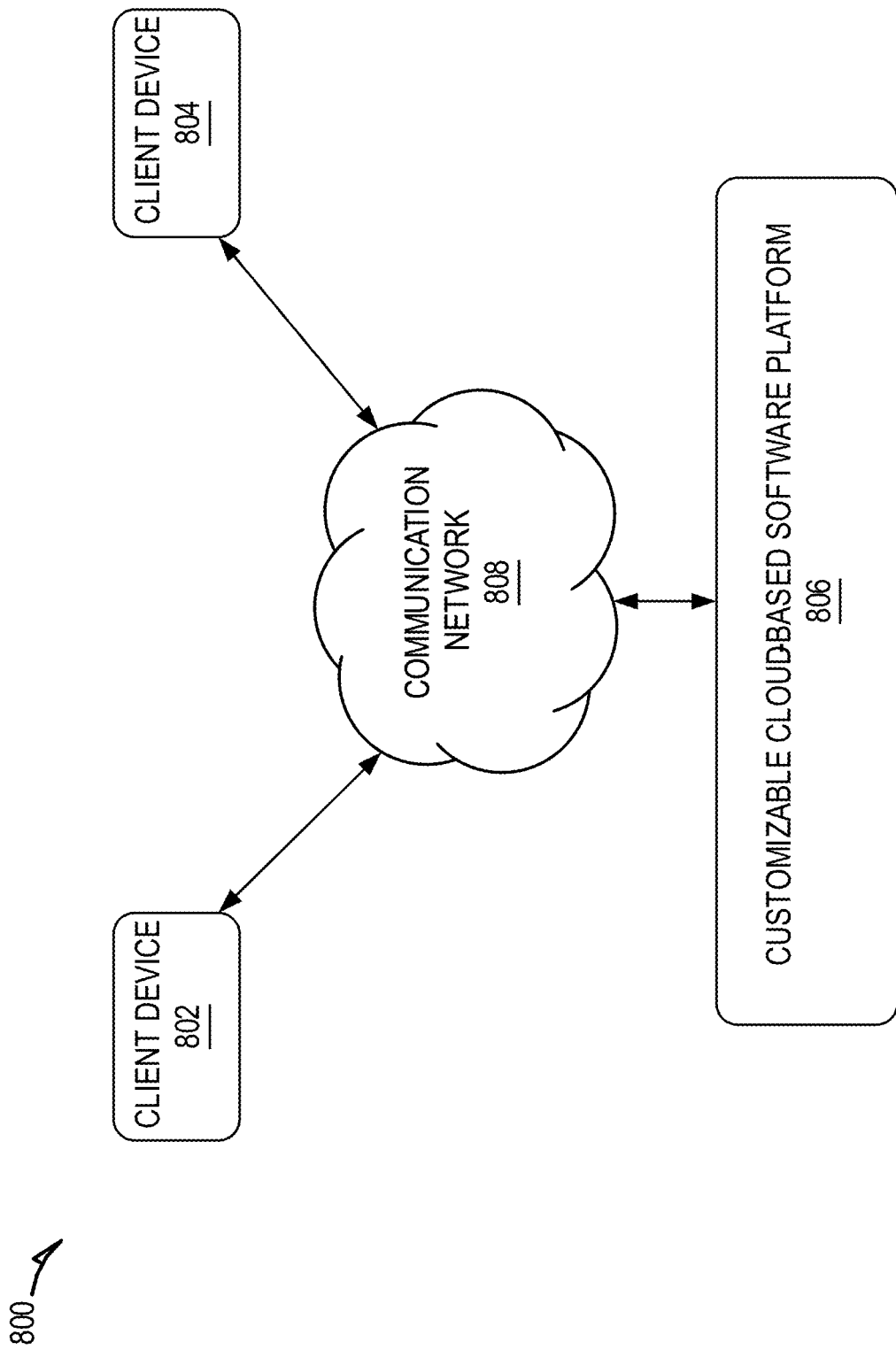
FIG. 10 is a system configuration for clients and a software platform communicating through a network.

"CLIENT DEVICE" in this context refers to any machine 1000 that interfaces to a communications network 1032 to obtain resources from one or more server systems or other client devices 802, 804 such as shown in FIG. 10. A client device 802, 804 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 1032.

"COMMUNICATIONS NETWORK" in this context refers to one or more portions of a network 1032 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1032 or a portion of a network 1032 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1010 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1010. The term "machine-readable medium" shall also be taken to include any medium, or combination of multiple media, that is capable of storing instructions 1010 (e.g., code) for execution by a machine 1000, such that the instructions 1010, when executed by one or more processors 1004 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1004) may be configured by software (e.g., an application 416 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1004 or other programmable processor 1004. Once configured by such software, hardware components become specific machines 1000 (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1004 configured by software to become a special-purpose processor, the general-purpose processor 1004 may be configured as respectively different special-purpose processors (e.g., comprising different hardware components) at different times. Software accordingly configures a particular processor or processors 1004, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1002) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1004 that are temporarily configured (e.g., by software) or permanently configured to perform the relevant operations. Whether temporarily or permanently configured, such processors 1004 may constitute processor-implemented components that operate to perform one or more operations or functions described herein. As used herein, "processor-implemented component" refers to a hardware component implemented using one or more processors 1004. Similarly, the methods described herein may be at least partially processor-implemented, with a particular processor or processors 1004 being an example of hardware. For example, at least some of the operations of a method may be performed by one or more processors 1004 or processor-implemented components. Moreover, the one or more processors 1004 may also operate to support performance of the relevant operations in a "cloud computing" environment or as a "software as a service" (SaaS). For example, at least some of the operations may be performed by a group of computers (as examples of machines 1000 including processors 1004), with these operations being accessible via a network 1032 (e.g., the Internet) and via one or more appropriate interfaces (e.g., an API). The performance of certain of the operations may be distributed among the processors 1004, not only residing within a single machine 1000, but deployed across a number of machines 1000. In some example embodiments, the processors 1004 or processor-implemented components may be located in a single geographic location (e.g., within a home environment, an office environment, or a server farm). In other example embodiments, the processors 1004 or processor-implemented components may be distributed across a number of geographic locations.

"PROCESSOR" in this context refers to any circuit or virtual circuit (a physical circuit emulated by logic executing on an actual processor 1004) that manipulates data values according to control signals (e.g., "commands," "op codes," "machine code," etc.) and which produces corresponding output signals that are applied to operate a machine 1000. A processor 1004 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 1004 may further be a multi-core processor having two or more independent processors 1004 (sometimes referred to as "cores") that may execute instructions 1010 contemporaneously.

What is claimed is:

1. A method for bandwidth allocation in multi-track media communication comprising:
   receiving a set of inbound media tracks;
   resolving track priority configuration for the set of media tracks;
   resolving media constraints that are at least partially derived from properties of the set of media tracks;
   producing bandwidth allocation configuration based on at least the track priority configuration and media constraints, wherein producing bandwidth allocation configuration comprises applying a series of processes that comprise of at least:
   maximizing a sum of bandwidth consumed by the set of media tracks,
   verifying the link does not consume more than the available bandwidth,
   verifying that no tracks are over a respective maximum bandwidth specified in the media constraints,
   for each track in the set of media tracks, verifying a track is over a minimum bandwidth specified in the media constraints, and
   regulating bandwidth allocation such that bandwidth allocation follows priorities of tracks specified in the track priority configuration; and
   allocating bandwidth to outbound media tracks within a communication link to a client device wherein bandwidth of the outbound media tracks is allocated based on the bandwidth allocation configuration.

2. The method of claim 1, further comprising receiving bandwidth estimation feedback and estimating available bandwidth of the communication link; and wherein producing the bandwidth allocation configuration is further based on the available bandwidth.

3. The method of claim 1, wherein the inbound media tracks are video media tracks from a set of participants; and wherein the communication link to the client device is a link of video media tracks.

4. The method of claim 1, wherein the inbound media tracks are audio media tracks from a set of participants; and wherein the communication link to the client device is a communication link of audio media tracks.

5. The method of claim 4, further comprising, for each track in the set of media tracks, setting the media track to a switched off state upon determining that the media track is not over a minimum bandwidth; and activating a media track in the switched off state to a switched on state upon determining that all the higher priority media tracks have been allocated a specified maximum bandwidth.

6. The method of claim 1, wherein the track priority configuration comprises of media policy configuration selected from a set of modes that comprises of at least a speaker detection mode, a presence detection mode, and a movement detection.

7. The method of claim 1, wherein resolving media constraints comprises determining a minimal bandwidth threshold and maximum bandwidth threshold derived from a media format of a media track.

8. The method of claim 1, wherein resolving track priority configuration for the set of media tracks comprises: setting media-based track priority, setting use-case track priority, and determining the track priority from the media-based track priority and the use-case track priority.

9. The method of claim 1, wherein allocating bandwidth to outbound media tracks within a communication link to a client device comprises transmitting the media tracks within a WebRTC peer connection to a client device.

10. The method of claim 9, wherein receiving a set of inbound media tracks comprises of receiving a media track from the client device through the WebRTC peer connection.

11. A machine-readable storage medium comprising instructions that, when executed by one or more processors of a machine, cause the machine to perform operations comprising:
    receiving a set of inbound media tracks;
    receiving track priority configuration for the set of media tracks;
    resolving media constraints that are at least partially derived from properties of the set of media tracks;
    producing bandwidth allocation configuration based on at least the track priority configuration and media constraints, wherein producing bandwidth allocation configuration comprises applying a series of processes that comprise of at least:
    maximizing a sum of bandwidth consumed by the set of media tracks,
    verifying the link does not consume more than the available bandwidth,
    verifying that no tracks are over their respective maximum bandwidth,
    for each track in the set of media tracks, verifying a track is over a minimum bandwidth, and
    regulating bandwidth allocation such that bandwidth allocation follows priorities of tracks; and
    allocating bandwidth to outbound media tracks within a communication link to a client device wherein bandwidth of the outbound media tracks is allocated based on the bandwidth allocation configuration.

12. The machine-readable storage medium of claim 11, further comprising instructions that cause the machine to perform operations that comprise of receiving bandwidth estimation feedback and estimating available bandwidth of the outbound link; and wherein producing the bandwidth allocation configuration is further based on the available bandwidth.

13. The machine-readable storage medium of claim 11, wherein the inbound media tracks are video media tracks from a set of participants; and wherein the communication link to the client device is a communication link of video media tracks.

14. The machine-readable storage medium of claim 11, wherein the inbound media tracks are audio media tracks from a set of participants; and wherein the communication link to the client device is a communication link of audio media tracks.

15. The machine-readable storage medium of claim 11, further comprising instructions that cause the machine to perform operations that comprise of, for each track in the set of media tracks, setting the track to a switched off state upon determining that the track is not over a minimum bandwidth; and activating a track in the switched off state to a switched on state upon determining that all the higher priority tracks have been allocated a specified maximum bandwidth.

16. A system for bandwidth allocation comprising:
    a media track interface through which a set of inbound media tracks are received;
    a policy manager configured to specify a track priority configuration for the set of media tracks;
    a bandwidth management system that is configured to resolve media constraints that are at least partially derived from properties of the set of media tracks, and set bandwidth allocation configuration based on at least the track priority configuration and media constraints; and a bandwidth allocator configured to allocate bandwidth to outbound media tracks within a communication link to a client device wherein bandwidth of the outbound media tracks is allocated based on the bandwidth allocation configuration and wherein the bandwidth allocation configuration is set through application of a series of processes configured to:

maximize a sum of bandwidth consumed by the set of media tracks, verify the link does not consume more than the available bandwidth, verify that no tracks are over their respective maximum bandwidth, for each track in the set of media tracks, verify a media track is over a minimum bandwidth and set the track to a switched off state upon determining that the media track is not over a minimum bandwidth, activate a track in the switched off state to a switched on state upon determining that all the higher priority tracks have been allocated a specified maximum bandwidth, and regulate bandwidth allocation such that bandwidth allocation follows priorities of tracks.

17. The system of claim 16, wherein the bandwidth management system further comprises a bandwidth estimator configured to estimate available bandwidth of the outbound link; and wherein configuration to produce the bandwidth allocation configuration is further configured to produce the bandwidth allocation configuration based on the available bandwidth.

* * * * *